United States Patent

Wigsten

[11] Patent Number: 5,846,150
[45] Date of Patent: Dec. 8, 1998

[54] GUIDE POSTS FOR GUIDING AND DAMPING CHAIN MOVEMENT

[75] Inventor: Mark M. Wigsten, Lansing, N.Y.

[73] Assignee: Borg-Warner Automotive, Inc., Sterling Hts., Mich.

[21] Appl. No.: 821,388

[22] Filed: Mar. 21, 1997

[51] Int. Cl.[6] .......................................................... F16H 7/18
[52] U.S. Cl. .............................................. 474/140; 474/111
[58] Field of Search .............................. 474/94, 101, 111, 474/112, 131, 133, 134, 136, 137, 138, 140

[56] References Cited

U.S. PATENT DOCUMENTS

| | | | |
|---|---|---|---|
| 2,723,566 | 11/1955 | Hyman | 74/242.1 |
| 4,820,245 | 4/1989 | Iyoda et al. | 474/140 |
| 5,045,032 | 9/1991 | Suzuki et al. | 474/140 |
| 5,184,983 | 2/1993 | Shimaya et al. | 474/111 |
| 5,318,482 | 6/1994 | Sato et al. | 474/111 |
| 5,427,580 | 6/1995 | Ledvina et al. | 474/84 |
| 5,665,019 | 9/1997 | Sheffer et al. | 474/111 |
| 5,679,084 | 10/1997 | Daniels, III | 474/140 |

FOREIGN PATENT DOCUMENTS

| | | |
|---|---|---|
| 52-6419 | 2/1977 | Japan . |
| 58-3142 | 1/1983 | Japan . |
| 63-3185 | 1/1988 | Japan . |
| 3-2952 | 1/1991 | Japan . |
| 4-119652 | 10/1992 | Japan . |
| 4-119654 | 10/1992 | Japan . |
| 5-42798 | 6/1993 | Japan . |
| 6-40357 | 10/1994 | Japan . |
| 5-321222 | 6/1995 | Japan . |

OTHER PUBLICATIONS

EPO Search Report for EP Application No. 98301488.7.

*Primary Examiner*—Thomas R. Hannon
*Attorney, Agent, or Firm*—Sidley & Austin; Greg Dziegielewski

[57] ABSTRACT

A chain guide system having one or more guide posts placed along the chain path. The guide posts are constructed of a bolt and a bushing and may also have an elastomeric isolator, coil spring, or rigid insert. The guide posts eliminate the need for longer, more expensive chain guides.

10 Claims, 4 Drawing Sheets

GUIDE POSTS FOR GUIDING AND DAMPING CHAIN MOVEMENT

BACKGROUND OF THE INVENTION

The present invention relates to a chain guide for guiding a drive chain and more particularly, to a chain guide system having one or more guide posts along the chain path.

In conventional engine timing systems, there is a crankshaft and corresponding sprocket system, which operate an engine with either single or dual overhead camshafts. The operation of a conventional engine timing system includes a chain, which extends from the crankshaft to the camshaft, or camshafts, and returns to the crankshaft in an endless loop. The movement of the crankshaft and chain causes the camshaft to rotate.

In dual overhead camshaft timing systems, one chain extends between a crankshaft and camshaft of a first bank of cylinders and another chain extends between a first camshaft and a second camshaft of a second bank of cylinders. Alternatively, a separate chain can drive between the two camshafts of each bank of cylinders in a dual overhead camshaft engine timing system. Examples of engine timing systems are shown in U.S. Pat. No. 5,427,580, entitled "Phased Chain Assemblies," which is incorporated herein by reference.

As the chain extends in an endless loop between the driving and the driven sprockets, such as those located on a crankshaft and camshaft, the chain forms a tight side and a slack side. The tight side is formed by the tension in the span of chain between the links entering the driving sprocket and the links leaving the driven sprocket. A slack side is formed on the other span of chain between the links leaving the driving sprocket and entering the driven sprocket.

Typically, the performance and action of the chain may differ between the tight and slack sides. A chain tensioner is conventionally used on the slack side of the chain to eliminate the slack in the chain. As the engine accelerates or decelerates, the tensioner arm may move closer to the chain to maintain the tension, i.e., eliminate the slack in the chain. The tensioner arm typically includes a convex surface to match the path of the chain.

In contrast, a chain guide is placed on the tight side of the chain. Generally, these chain guides are made of metal, such as aluminum, and a concave part is often formed on the back sides, opposite to the chain contact side, for weight reduction and material savings. The guide serves to maintain the desired path of the chain between the sprockets.

In the use of a chain tensioner on the slack side of the chain, the tensioner arm is subject to vibrations from the cam and crank torque oscillations. Such vibration can cause wear on a tensioner arm surface.

Guide isolators attached to a traditional chain guide reduce the vibration transmitted from the chain. For example, the Anatrol/Ford isolated guide, shown in FIG. 9, comprises two rubber flanges 93 and 94 that. sandwich the guide 92 and are held by a guide bolt 95. The guide bolt 95 clamps the rubber flange 94 against an engine block 91. The guide bolt 95 is isolated from the guide 92, and the guide 92 is isolated from the block 91. The problem with this guide is that the fastener presses the rubber flanges 93 and 94, which eventually crushes the rubber and creates a material failure. Thus, there are durability problems. This prior art guide isolator is also sensitive to torque fluctuations and is unable to effectively damp vibrations occurring from such fluctuations.

As shown in FIG. 10, another example of a guide is the Lord isolated guide found on the Ford 2.51 DOHC V-6 NVH engine. This prior art guide is comprised of a steel sleeve 105 bonded to an elastomer insert 104. The guide bolt 106 rigidly clamps the elastomer insert 104 against the guide 102 and steel sleeve 105, which allows a complete bolt torque to be applied to the guide bolt 106. The guide 102 is isolated from the block 101 by the elastomer insert 104. Thus, FIG. 10 shows a traditional chain guide with an isolation bushing between the bolt and the guide, which differs from the guide posts of the present invention.

The present invention reduces vibration transmitted from the chain, but the present invention is directed to a chain guide system having one or more guide posts placed along a tight side of the chain. The use of the guide posts eliminates the need for larger, more expensive chain guides that are currently used in engine timing systems. The guide posts of the present invention have a thermoplastic or an elastomeric bushing with a shoulder bolt that attaches to an engine block. The guide posts of the present invention are smaller in size and lighter in weight and result in lower noise and lower loads against the chain than a chain drive using conventional chain guides.

SUMMARY OF THE INVENTION

The present invention is directed to a chain guide system having one or more guide posts along the chain path. In a first embodiment of the present invention, the guide post is constructed of a thermoplastic or elastomeric bushing and a shoulder bolt. The shoulder bolt allows the bushing to rotate, while holding the guide post to an engine block. Rotation allows the chain to contact different portions of the bushing so that wear on the chain guide is reduced.

In a second embodiment of the present invention, the guide post is constructed of a thermoplastic bushing, a shoulder bolt, and an elastomeric isolator. The elastomeric isolator minimizes vibrations carried by the bolt to reduce the operating noise. The vibration minimization is dependent upon the damping properties of the elastomeric isolator.

In a third embodiment of the present invention, the guide post is constructed of a thermoplastic bushing, a shoulder bolt, and a coil spring. The spring reduces wear of the bushing by allowing motion of the bushing relative to the bolt. Further, the spring reduces noise from the chain drive contacting the guide by reducing the impact loads transmitted through the bolt into the engine. Chain loads may also be reduced on systems where the chain is not guided on a straight path between the sprockets.

In a fourth embodiment of the present invention, the guide post is constructed of a thermoplastic or elastomeric bushing, a bolt and a rigid insert that prevents rotation. Prevention of rotation may also reduce any noise caused by the spinning of the guide post. The rigid insert is typically made of steel or powdered metal. The guide posts are placed at interval locations along the chain determined by the chain waveform, i.e., spring rate, free strand length, and mass per length.

Other objects, features, and advantages of the present invention will become apparent from the following detailed description when read in conjunction with the accompanying drawings.

DETAILED DESCRIPTION OF THE PREFERRED EMBODIMENTS

Figure 1:
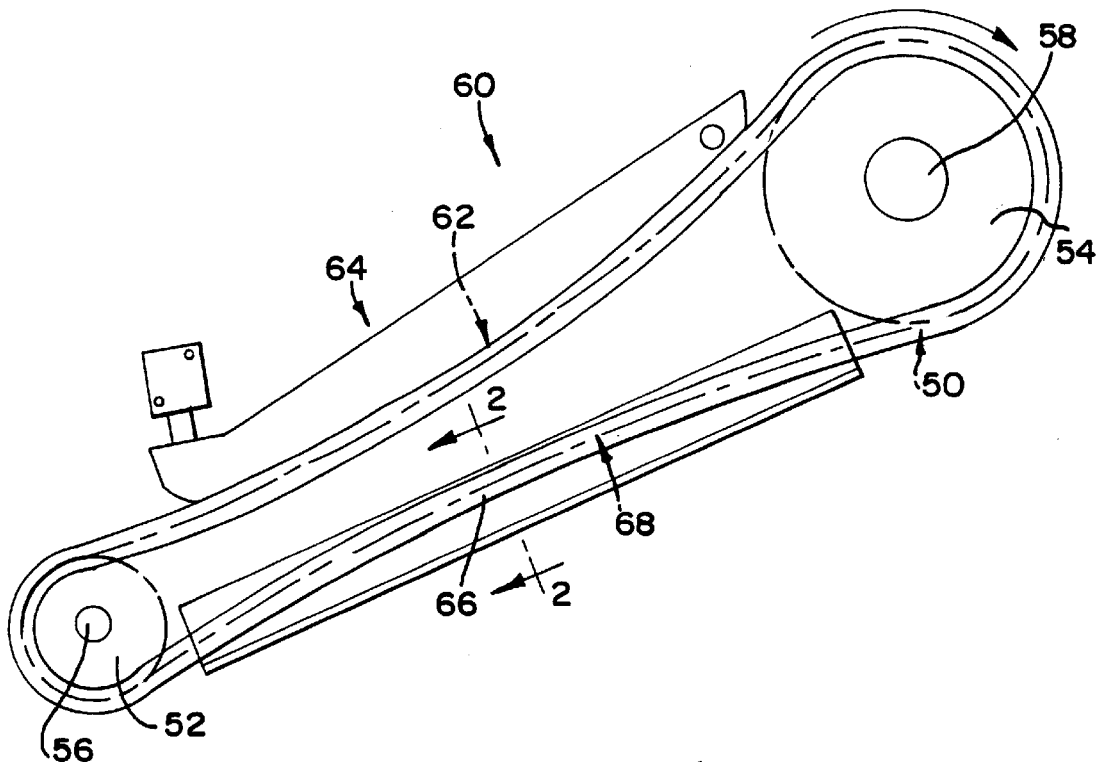
FIG. 1 is a side view of a power transmission chain and guide system in an engine timing system between the crankshaft and one camshaft.
Figure 2:
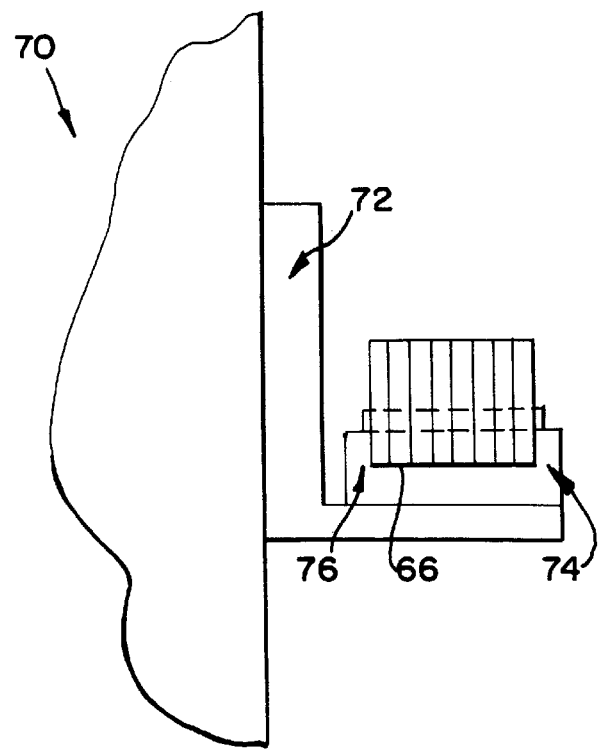
FIG. 2 is a cross-sectional view of the guide of FIG. 1 illustrating the position of the guide.

FIGS. 1 and 2 illustrate a conventional chain timing system and chain guide of the prior art. Chain 50 wraps around sprockets 52 and 54, which are placed along crankshaft 56 and camshaft 58. A tensioner 60 is located along the slack side 62 of the chain 50. The tensioner includes an arm 64 pressed against the chain 50. A guide 66 is located on the tight side 68 of chain 50. Section 2—2 of FIG. 1, as shown in FIG. 2, illustrates the guide 66 mounted against block 70 by bracket 72. The guide 66 sits on the bracket 72 and has upraised sides 74 and 76 to guide the chain 50.

Figure 3:
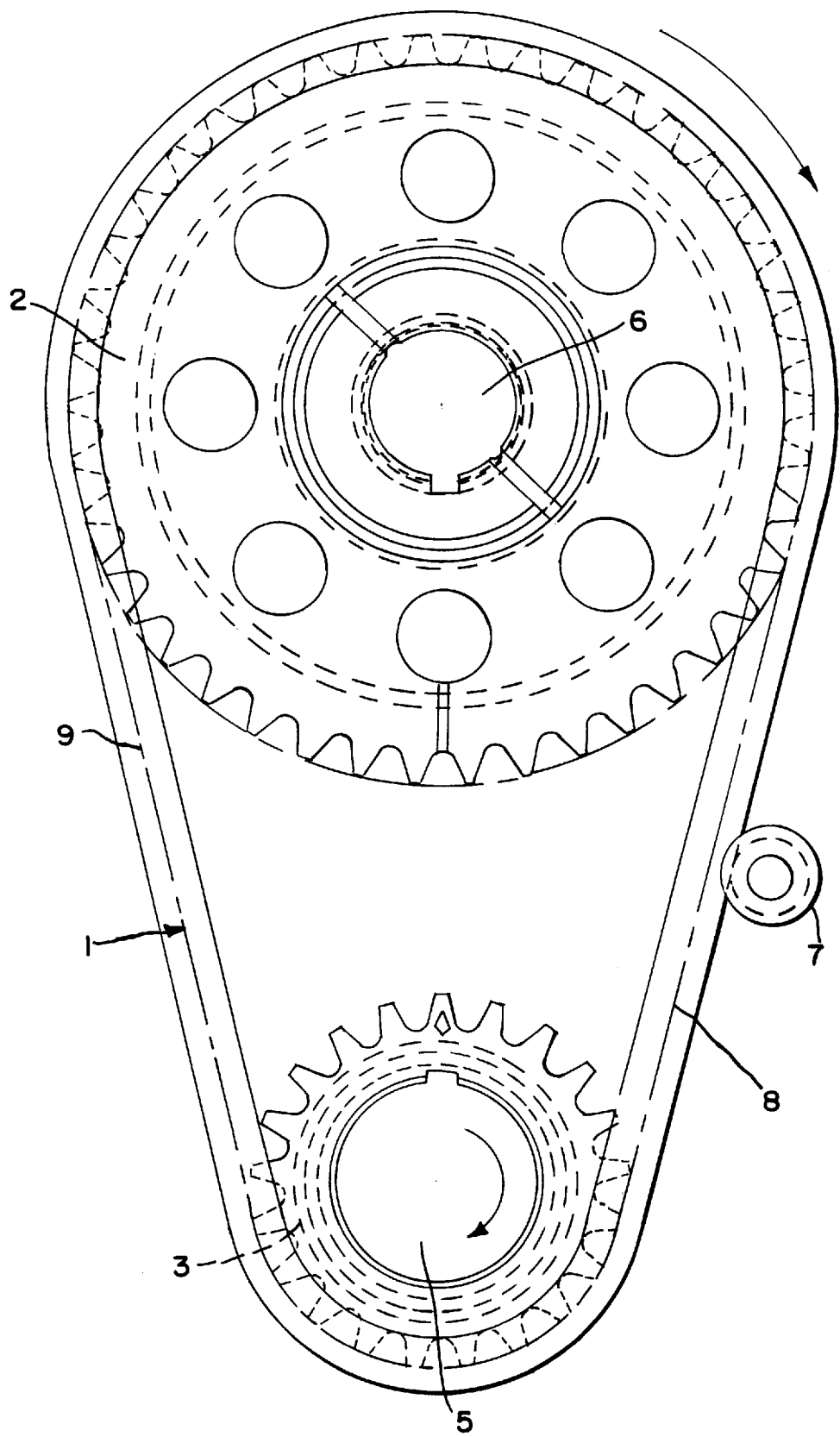
FIG. 3 is a front elevational view of a timing drive for a cam-in-block engine with a chain guide of the present invention on a tight side of a chain strand.

FIG. 3 illustrates a timing drive for a cam-in-block engine in which the guide post of the present invention may be applied. Chain 1 wraps around sprockets 3 and 2, which are placed along crankshaft 5 and camshaft 6, respectively. The movement of crankshaft 5 causes the sprocket 3 to rotate, which, in turn, causes sprocket 2 and camshaft 6 to rotate.

The crankshaft sprocket 3 is the driving sprocket, and thus, the tight side 8 of the chain 1 is formed between the links entering the crankshaft sprocket and leaving the camshaft sprocket 2. The slack side 9 is opposite side of the chain 1 between the two sprockets 2 and 3.

A guide post 7 is located on the tight side 8 of the chain 1 to keep the chain 1 in position. The guide post 7 is attached to an engine block (not shown). The chain 1 is forced into motion by the sprockets 2 and 3, resulting in its movement across or through the guide post 7.

Figure 4:
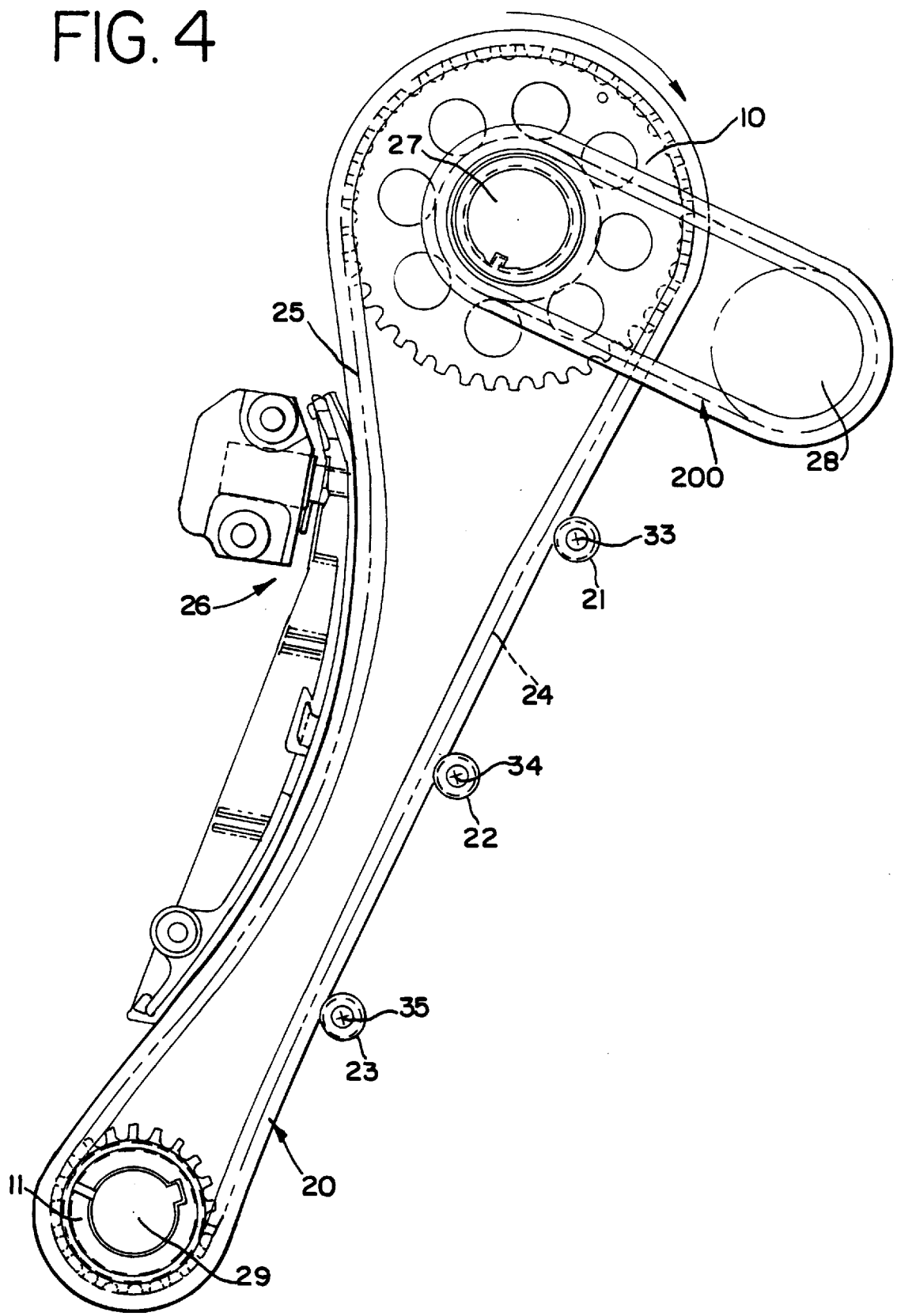
FIG. 4 is a side view of a timing drive for an overhead cam engine using a plurality of guide posts of the present invention on a tight side of a chain strand.

In FIG. 4, a timing drive for an overhead cam engine is shown having three guide posts, 21, 22, and 23, on a tight side 24 of chain 20, which wraps around sprockets 10 and 11. The timing drive shown in FIG. 4 is for one bank of cylinders of a V-type engine. The guide posts 21, 22, and 23 are attached to an engine block (not shown) with bolts 33, 34, and 35, respectively. The sprockets 10 and 11 are placed along camshaft 27 and crankshaft 29, respectively. The movement of crankshaft 29 causes the sprocket 11 to rotate, which, in turn, causes sprocket 10 and camshaft 27 to rotate.

The number of posts is dependent upon the application. The locations of the posts are determined by the chain waveform factors, such as spring rate, mass per length, and free strand length. On the slack side 25 of the chain 20, there is a tensioner 26 to maintain the tension. The camshaft-to-camshaft drive operates the second camshaft 28. Thus, chain 200 is wrapped about sprockets associated with camshaft 27 and camshaft 28.

Figure 5:
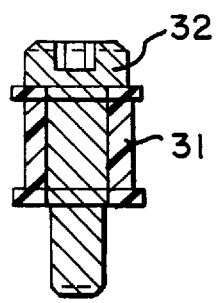
FIG. 5 is a cross-sectional view of a first embodiment of the chain guide post of the present invention.

In the first embodiment of the present invention, the guide post, as shown in FIG. 5, includes a thermoplastic bushing 31 and shoulder bolt 32. An elastomeric bushing may be substituted for the thermoplastic bushing. The shoulder bolt 32 attaches to an engine block. The tight side of a chain is guided by the thermoplastic bushing 32. In this embodiment, the bushing 31 is free to rotate so that the chain contacts more surface area of the guide post bushing. Thus, wear is reduced.

Figure 6:
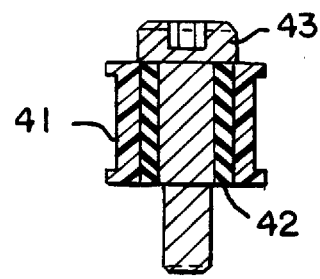
FIG. 6 is a cross-sectional view of a second embodiment of the chain guide post of the present invention.

In the second embodiment of the present invention, the guide post, as shown in FIG. 6, has a thermoplastic bushing 41, an elastomeric isolator 42, and a shoulder bolt 43. The shoulder bolt 43 attaches to an engine block, and the thermoplastic bushing guides the tight side of a chain. The bushing 41 in this embodiment is also free to rotate in order to reduce the wear on the chain guide. The elastomeric isolator 42 minimizes vibrations into the bolt 43 to reduce the operating noise. The minimization of vibration is dependent upon the damping properties of the elastomeric isolator.

Figure 7:
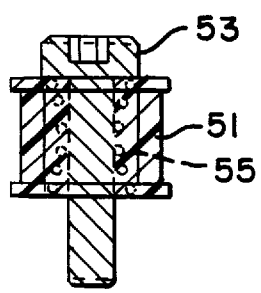
FIG. 7 is a cross-sectional view of a third embodiment of the chain guide post of the present invention.

FIG. 7 shows the third embodiment of the present invention, which includes a thermoplastic bushing 51, a coil spring 55, and a shoulder bolt 53. The bushing 51 is attached to an engine block. The bushing 51 guides the tight side of a chain and is free to rotate. Thus, the wear on the chain guide is reduced. The spring 55 reduces wear on the bushing 51 by allowing motion of the bushing 51 relative to the bolt 53. Further, the spring 55 reduces noise of the chain drive by reducing the impact loads transmitted through the bolt 53 into the engine. Chain loads may also be reduced on systems where the chain is not guided on a straight path between the sprockets.

Figure 8:
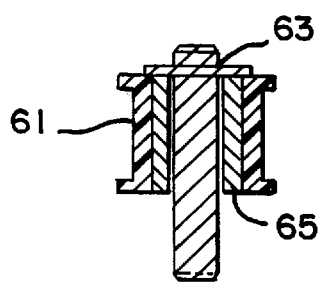
FIG. 8 is a cross-sectional view of a fourth embodiment of the chain guide post of the present invention.
Figure 9:
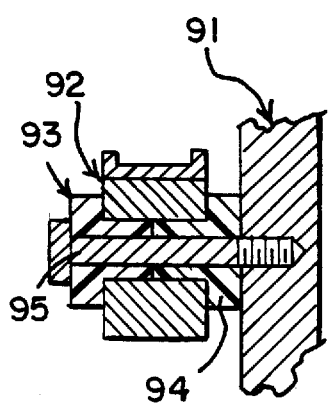
FIG. 9 is a cross-sectional view of an isolated guide of the prior art.
Figure 10:
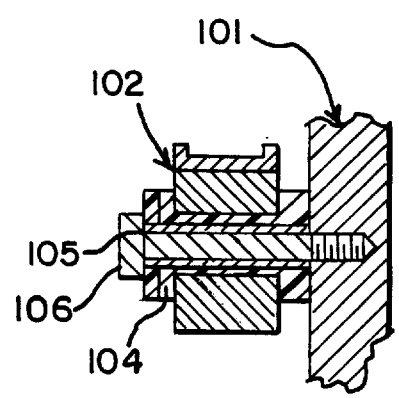
FIG. 10 is a cross-sectional view of another isolated guide of the prior art.

In the fourth embodiment of the present invention, shown in FIG. 8, the guide post has a thermoplastic bushing 61, a rigid insert 65, and a bolt 63. An elastomeric bushing may be substituted for the thermoplastic bushing. In this embodiment, the bushing 61 may be prevented from rotating in order to reduce noise caused by the spinning of the guide post. The bolt 63 attaches to an engine block, and the bushing 61 guides the tight side of a chain.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A power transmission chain and guide system comprising:
   a plurality of sprockets, including at least one driving sprocket connected to a power input and at least one driving sprocket connected to a power output;
   a chain assembled of rows of interleaved links, said chain wrapped around said plurality of sprockets, said chain including at least one tight strand portion having some links being pulled by said driving sprocket and at least one slack portion; and at least one chain guide post located along and directly contacting said tight strand portion of said chain, said chain guide post including a bushing and a bolt, said bolt being located through the center of said bushing, said bushing being permitted to rotate with respect to said bolt, movement of said chain resulting in rotation of said bushing with respect to said bolt as a result of said contact with said chain.

2. The chain and guide system of claim 1 wherein the bushing is formed of a thermoplastic material.

3. The chain and guide system of claim 1 wherein the bushing is formed of an elastomeric material.

4. The chain and guide system of claim 1 further comprising a plurality of chain guide posts located along said tight strand portion of said chain, said chain guide posts including a bushing and a bolt, said bolt being located through the center of said bushing.

5. The chain and guide system of claim 1 wherein said bolt includes a shoulder extending beyond the end of said bushing.

6. The chain and guide system of claim 5 wherein said bushing includes an elastomeric isolator located therein.

7. The chain and guide system of claim 5 wherein said bushing includes a coil spring located therein.

8. The chain and guide system of claim 1 wherein said bushing includes a rigid sleeve located between said bushing and said bolt.

9. The chain and guide system of claim 8 wherein the rigid sleeve is formed from steel.

10. The chain and guide system of claim 8 wherein the rigid sleeve is formed from powder metal.

* * * * *